United States Patent [19]

Crane et al.

[11] Patent Number: 4,631,727
[45] Date of Patent: Dec. 23, 1986

[54] COLD CATHODE GAS TUBES

[75] Inventors: Dale E. Crane, Sunnyvale, Calif.; Robert E. Jones, Lesington, Mo.; Mathew D. Watson, Sunnyvale, Calif.; Alan D. White, Berkeley Heights, N.J.

[73] Assignee: UNIPHASE Corporation, Sunnyvale, Calif.

[21] Appl. No.: 724,583

[22] Filed: Apr. 18, 1985

[51] Int. Cl.⁴ .............................................. H01S 3/00
[52] U.S. Cl. ........................................ 372/33; 372/87; 372/98; 372/29
[58] Field of Search ...................... 372/55, 61, 87, 33, 372/86, 81, 98, 29

[56] References Cited

U.S. PATENT DOCUMENTS

| 3,782,372 | 2/1974 | Mark | 331/199 |
| 4,190,810 | 2/1980 | Bayley | 372/86 |
| 4,352,185 | 9/1982 | Crane | 372/29 |

OTHER PUBLICATIONS

"Designer's Handbook-The Helium-Neon Laser: What It is and How It Works"-by Bhogi Patel-Jan. 1983--Photonics Spectra.

Primary Examiner—Leon Scott, Jr.
Attorney, Agent, or Firm—Sylvan Sherman

[57] ABSTRACT

The turn-on delay of a cold cathode gas tube, such as a gas laser, is significantly reduced by the inclusion of an electric field concentrator in a region of the tube between the tube anode and cathode. The concentrator can take the form of a projecting conductive member having a sharp corner, linear or curved knife edge, needle like points, or combinations of such geometries.

10 Claims, 5 Drawing Figures

COLD CATHODE GAS TUBES

TECHNICAL FIELD

This invention relates to cold cathode gas tubes and, in particular, to gas lasers and arrangements for reducing the turn-on delay and the breadkdown voltage in such devices.

BACKGROUND OF THE INVENTION

Gas lasers and, in particular, helium-neon (HeNe) lasers are well known in the art. See, for example, the article by Bhogi Patel entitled "The Helium-Neon Laser: What It Is and How It Works" published in the January 1983 issue of PHOTONICS SPECTRA, pp. 33–38. Typically, in such devices, a high d.c. voltage, in the range between 5 KV and 10 KV, is applied across the tube and its associated current-limiting series resistor in order to break down the gas and establish a steady-state discharge at a normal operating current of a few milliamperes. The process is set in motion when an initiating charged particle (most often an electron present within the gas volume between the tube electrodes and subject to the electric field established by the applied voltage) gains sufficient energy to produce positive ion-electron pairs by collision with neutral gas atoms. The secondary electrons thus created are, in turn, accelerated by the electric field to produce additional ion-electron pairs, resulting in an exponential growth in the number of charged particles moving in the direction of the electric field. Breakdown, and a transition to the lower voltage, self-sustaining glow discharge mode occurs when the positive ions formed move to the cathode and produce enough electrons by secondary emission to replace the initiating electron.

The time delay between the application of the high voltage to the laser tube and the appearance of a glow discharge is termed the breakdown delay. This delay has two components. One component, the statistical delay, is associated with the time required for an ionizing particle to appear at an appropriate place in the tube to initiate breakdown. The other component, termed the formative delay, is the time required for the initial electron avalanche to build up to the point where a glow discharge appears. This latter delay, at the large voltages typically used to start gas lasers, is relatively small compared to the statistical delay and can be neglected for most practical applications. The statistical delay, on the other hand, can be significant. Techniques for reducing this delay are described, for example, in U.S. Pat. Nos. 3,792,372; 4,190,810; and 4,352,185. The first patent discloses the use of an additional starting electrode. The second adds a strip of electrically conductive plastic material on the outer lateral surfaces of the laser tube. Such techniques, even if efficacious, tend to add to the cost of the laser and, hence, are not commercially attractive. In the last of the above-identified patents, a small amounts of radioactive material is included within the tube. However, restrictive BRH regulations regarding the use, labeling and disposal of radioactive materials tend to discourage their use.

It is also well known that gas breakdown can be accelerated in tubes exposed to light. However, in practice, laser tubes are generally enclosed in protective housings and, as such, are in total darkness prior to the initiation of a discharge.

Absent such ionizing mechanisms, the statistical delay is determined by the need to wait for a cosmic ray event, or some other radioactive event to occur that generates at least one electron in a favorable position between the tube electrodes. In commercially manufactured tubes of the type described in the above-identified article, and to be described in greater detail hereinbelow, delays of the order of one to more than 15 seconds are common. For many applications, such as bar code scanners commonly use in supermarkets, delays of such magnitude are unacceptable.

It is, accordingly, the broad object of the present invention to reduce the breakdown delay in cold cathode tubes such as gas lasers.

A second object of the invention is to reduce the magnitude of the high voltage necessary to produce breakdown in gas lasers without adversely affecting the breakdown delay.

SUMMARY OF THE INVENTION

The mechanical structure of modern gas laser tubes is determined largely by the need to maintain the laser mirrors, that define the laser cavity, in precise optical alignment despite changes in tube temperature and external mechanical vibrations and stresses. As will be described in greater detail hereinbelow, the tube typically includes; (a) a small bore capillary tube whose axis extends between the cavity mirror, and within which the discharge is made to occur; (b) a cylindrical cathode concentric with the bore and electrically connected to a cathode end cap that supports a first cavity mirror; (c) an outer enclosing glass cylinder; and (d) an anode end cap that provides an electrical connection and supports the second cavity-defining mirror. Because of the nonplanar electrode geometry of the typical gas laser tube, the breakdown electrical field in the gas is highly non-uniform. This gives rise to microdischarges which occur outside the bore in the region of the anode. These, in turn, produce charging of the surface of the glass septum supporting the capillary tube which effectively reduces the magnitude of the net electric field at the bore below that required for rapid breakdown. It has been discovered that these microdischarges can be suppressed, and breakdown speeded up by placing an electric field concentrator at the anode end of the bore. The concentrator, which can be a simple pointed projection positioned at the bore entrance, produces a region of high field intensity, and increases the probability of breakdown occurring in this preferred region of the bore. It also tends to inhibit microdischarges outside the bore region.

These are other features and advantages of the invention will be described in greater detail hereinbelow in connection with the various figures.

DETAILED DESCRIPTION

Figure 1:
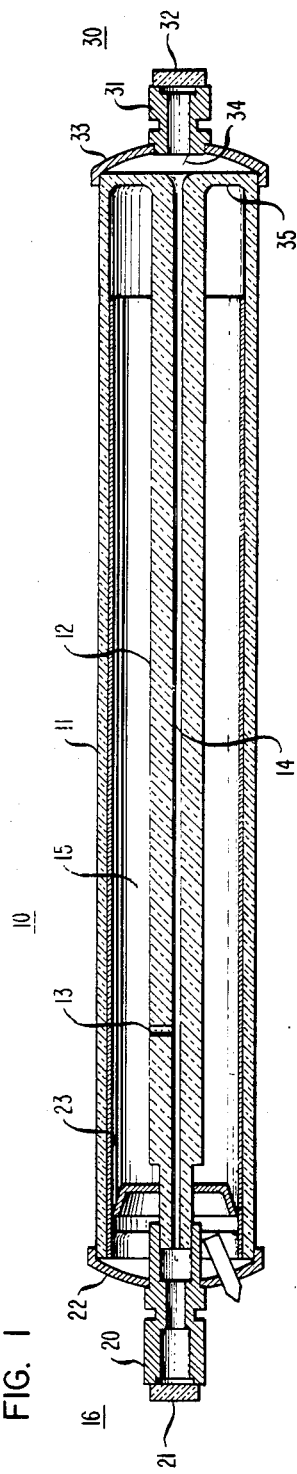
FIG. 1 shows a longitudinal cross-section of a typical gas laser.

Referring to the drawings, FIG. 1 shows a longitudinal cross section of a typical gas laser 10 in which there is incorporated a field concentrator in accordance with the teaching of the present invention. Typically, such devices comprise an outer glass envelope 11, and an inner coaxially aligned, capillary tube 12 which serves as the plasma-discharge confining region of the laser. A cross bore 13, extendings through the wall of tube 12, connects the space between tubes 11 and 12 with the bore region 14 within tube 12. A cathode end cap assembly 16 is located at the left end of laser 10. This includes a hollow conductive member 20, at one end of which one of the cavity-defining mirrors 21 is mounted. The other end of member 20 is adapted to receive and support one end of capillary tube 12. The assembly is sealed to the adjacent end of tube 11 by means of an end cap 22. Also extending along the inside wall of laser tube 11 is an electrically and thermally conductive cathode liner 23. The latter, which extends along most of the length of tube 11 serves to maintain a uniform temperature along the laser tube, as explained in the above-identified U.S. Pat. No. 4,352,185.

Similarly disposed at the right end of the laser is the anode assembly 30 comprising a hollow, electrically conductive member 31, at one end of which a second cavity-defining mirror 32 is located. At this end, capillary tube 12 is supported by means of a glass septum 35 which extends radially from the end of the tube. A domed end cap 33 secures the anode assembly to the laser tube. In addition, the anode further includes a field concentrator 34 which is conductively connected to member 31 and protrudes into the bore region of capillary tube 12. This is shown in greater detail in FIGS. 2, 3 and 4 now to be considered.

Figure 3:
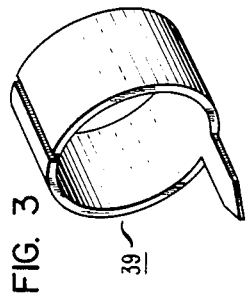
FIGS. 2 and 3 shows a first embodiment of a field concentrator prior to its insertion into the anode of the gas laser shown in FIG. 1.
Figure 2:
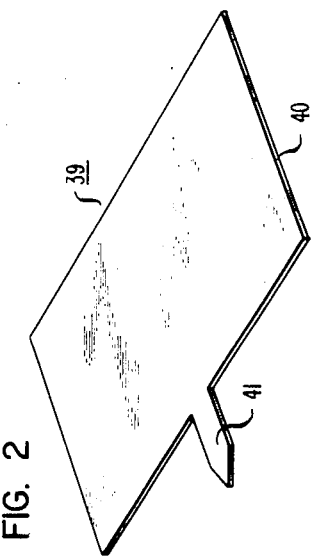
Figure 4:
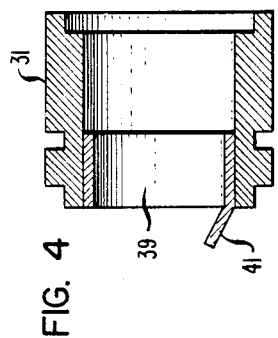
FIG. 4 shows the concentrator of FIGS. 2 and 3 in position in the anode of said gas laser.

It is well known that an electric field tends to be concentrated in the region of projecting sharp corners and points, resulting in a significant increase in the electric field intensity. This principle is utilized, in accordance with the present invention, to increase the electric field density in the region of anode 31. FIG. 2 shows a first embodiment of a field concentrator 39 prior to its insertion into anode 31. It consist primarily of a rectangular piece of conductive material 40 from which there extends a projecting portion 41. FIG. 3 shows the concentrator rolled into a cylindrical shape for insertion into anode 31, as illustrated in FIG. 4. Advantageously, the end of projecting portion 41 is pointed and bent so as to point toward the bore region of capillary tube 12.

Figure 5:
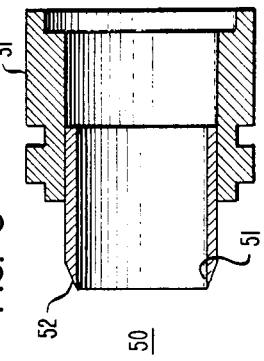
FIG. 5 shows a second embodiment of a field concentrator for use in connection with the present invention.

FIG. 5 shows a second embodiment of a field concentrator 50. In this configuration, the pointed portion 41 is omitted and, instead, one entire end 52 of the projecting conductive member 51 is tapered to produce a cylindrical knife edge about which the field is concentrated.

Laser tubes incorporating a field concentrator of the type described have shown remarkable reductions in breakdown delay. Typical delays of from 1 to 27 seconds have been reduced to less than 150 milliseconds. In addition, it appears that these results can be obtained consistently and with lower applied voltages.

While the invention has been described with specific reference to gas lasers, it will be recognized that the principles of the invention can just as readily be applied to other types of cold cathode gas tubes. Similarly, alternate configurations of the field concentrator can be utilized, employing sharp corners, linear or curved knife edges, needle-like points or combinations of such geometries. In general, projections of any shape whose length-to-width ratios are large tend to distort the electric field and, in particular, produce regions of high electric field intensity. For example, projecting members having length-to-width ratios of five or more produce the desired result.

What is claimed is:

1. In a cold cathode gas tube comprising an anode and a cathode, the improvement including an electric field concentrator located in the region between said anode and said cathode.

2. The arrangement according to claim 1 wherein said tube is a laser tube.

3. The arrangement according to claim 2 wherein the gas in said laser tube is a combination of helium and neon.

4. A gas laser comprising:
   a hermetically sealed, elongated envelope enclosing a gaseous medium capable of supporting stimulated emission of radiation in response to an electric field impressed across said gaseous medium;
   means, including an anode and a cathode, for producing an electrical field within said tube when externally energized;
   characterized in that:
   said means further includes an electric field concentrator for locally increasing the field intensity in a region within said medium.

5. The combination according to claim 4 wherein:
   said laser includes a capillary tube extending between said cathode and said anode;
   and wherein said field concentrator is located adjacent to said anode.

6. The combination according to claim 5 wherein said field concentrator is conductively connected to said anode.

7. The combination according to claim 6 wherein said field concentrator is a conductive member located in the region of said gaseous medium between said anode and said capillary tube.

8. The combination according to claim 4 wherein said field concentrator is a projecting conductive member.

9. The combination according to claim 8 wherein said projecting member is pointed.

10. The combination according to claim 4 wherein said field concentrator is a projecting hollow, cylindrical conductive member having a tapered end to form a cylindrical knife edge.

* * * * *